(12) United States Patent
Baudisch et al.

(10) Patent No.: US 8,459,603 B2
(45) Date of Patent: Jun. 11, 2013

(54) ON BOARD SCREEN DEVICE

(75) Inventors: Andreas Baudisch, Offenbach (DE);
Klaus Karl, Geinhausen (DE); Robert Wolfgang Kissel, Egelsbach (DE);
Georg Nehm, Niedernberg (DE);
Marcel Rigorth, Babenhausen (DE);
Günter Urlaub, Schaafheim (DE)

(73) Assignee: Continental Automotive GmbH, Hannover (DE)

( * ) Notice: Subject to any disclaimer, the term of this patent is extended or adjusted under 35 U.S.C. 154(b) by 479 days.

(21) Appl. No.: 12/310,941

(22) PCT Filed: Sep. 11, 2007

(86) PCT No.: PCT/EP2007/059505
§ 371 (c)(1),
(2), (4) Date: Apr. 7, 2009

(87) PCT Pub. No.: WO2008/031812
PCT Pub. Date: Mar. 20, 2008

(65) Prior Publication Data
US 2009/0272776 A1 Nov. 5, 2009

(30) Foreign Application Priority Data
Sep. 12, 2006 (DE) .......................... 10 2006 042 693

(51) Int. Cl.
*E04G 3/00* (2006.01)
*A47F 1/10* (2006.01)
*B60J 7/057* (2006.01)
*B60R 7/04* (2006.01)

(52) U.S. Cl.
USPC .................. 248/292.14; 248/299.1; 248/917; 296/37.13; 296/223

(58) Field of Classification Search
USPC .................. 248/27.3, 917, 920, 280.1, 279.1, 248/281.11, 286.1, 291.1, 292.14, 298.1, 248/299.1; 361/679.01, 679.02, 679.21, 679.27, 361/681, 683, 680, 727; 296/37.12, 37.8, 296/37.1, 37.7, 37.13, 216.04, 221, 222, 296/223; 297/37.8, 217.3, 411.33, 411.35; 345/168, 173, 174, 87, 905; 348/836, 837; 312/7.2, 237, 319.7, 319.5, 319.6
See application file for complete search history.

(56) References Cited

U.S. PATENT DOCUMENTS 4,983,951 A * 1/1991 Igarashi et al. ............... 340/461
5,184,489 A * 2/1993 Squires et al. ............. 296/37.12
(Continued)

FOREIGN PATENT DOCUMENTS

| DE | 197 29 856 | 1/1999 |
|---|---|---|
| DE | 199 38 690 | 2/2001 |
| DE | 100 08 887 | 10/2001 |
| DE | 100 42 495 | 3/2002 |
| DE | 101 20 314 | 3/2002 |
| DE | 103 36 506 | 3/2005 |

(Continued)

Primary Examiner — Tan Le
(74) Attorney, Agent, or Firm — Cozen O'Connor

(57) ABSTRACT

A motor vehicle screen device having a screen that can be driven by a driving mechanism between an inactive position within a cavity of a dashboard and an approximately vertical active position outside the cavity and from the active position into the inactive position. The screen is provided with spaced-apart guiding elements which are guided within guides that run nearly horizontal, perpendicular to the movement path of the screen. The monitor can be driven such that the guiding elements thereof are movable within the guides. At least one of the guiding elements is locked at the active position end of the guide by a locking mechanism.

20 Claims, 6 Drawing Sheets

U.S. PATENT DOCUMENTS

| | | | | |
|---|---|---|---|---|
| 5,374,104 A | * | 12/1994 | Moore et al. | 297/188.16 |
| 5,847,685 A | | 12/1998 | Otsuki | |
| 6,011,685 A | * | 1/2000 | Otsuki | 361/679.01 |
| 6,669,258 B1 | | 12/2003 | Kato | |
| 2009/0272776 A1 | * | 11/2009 | Baudisch et al. | 224/483 |

FOREIGN PATENT DOCUMENTS

| | | |
|---|---|---|
| JP | 6-191352 A | 7/1994 |
| JP | 2003-276515 A | 10/2003 |
| WO | WO 03/093062 | 11/2003 |

\* cited by examiner

ON BOARD SCREEN DEVICE

PRIORITY CLAIM

This is a U.S. national stage of application No. PCT/EP2007/059505, filed on 11 Sep. 2007, which claims priority to the German Application No.: 10 2006 042 693.2, filed: 12 Sep. 2006, the content of both being incorporated here by reference.

BACKGROUND OF THE INVENTION

1. Field of the Invention

The invention relates to an on-board monitor device for a motor vehicle, having a monitor that can be movably driven by means of a drive mechanism from an approximately horizontal inactive position inside a recess of a dashboard through an opening of the recess into an approximately perpendicular active position outside the recess, and from the active position into the inactive position. Guide elements that are arranged on the monitor spaced from one another, which are guided in a pair of permanently arranged guides that extend approximately horizontally transverse to the course of movement of the monitor and run in parallel at a spacing from one another in a region closer to the inactive position and have, in a region closer to the active position, an increasing spacing from one another toward the end of the guides. the monitor is movably driven in the guides with the aid of its guide elements.

2. Description of the Prior Art

On-board monitor devices have the disadvantage that when force is applied to the monitor in a nonfunctional fashion, these forces can be transmitted to the drive mechanism and possibly a drive and can lead to instances of damage.

SUMMARY OF THE INVENTION

It is therefore an object of the invention to provide an on-board monitor device such that instances of damage from the application of force to the monitor is at least largely avoided.

This object is achieved according to one embodiment of the invention by virtue of the fact that at least one of the guide elements is locked in an active position end of its guide by a locking device. Consequently, forces acting on the monitor are absorbed by the locking device and are therefore not transmitted to the drive mechanism or to a drive.

It follows that the forces cannot lead to instances of damage to drive mechanism and drive.

Moreover, these parts need not be designed to absorb high forces.

For the purpose of stable guidance and holding of the monitor, a pair of guides and corresponding guide elements are preferably arranged on both sides of the monitor.

A forced movement of the monitor from a horizontal inactive position inside the recess of the dashboard into an approximately perpendicular active position outside the recess is achieved way by virtue of the fact that the spacing of the guides in a region where they run parallel to one another is smaller than the spacing of the guide elements from one another, and the spacing of the active position ends of the guides corresponds at least approximately to the spacing of the guide elements.

It is preferred that upon a movement of the monitor into its active position a leading guide element reaching the active position end of the guide assigned to said monitor can firstly be locked in its active position by the locking device.

In one embodiment the locking device consists in that the locking device is a spring latching device.

In another embodiment, the locking device has an interlocking mechanism configured to swivel about a stationary swivel pin extending transverse to the course of movement of the monitor and that can be swivably shifted by a lagging guide element from an unlocked position into a locked position engaging the leading guide element from a rear of the lagging guide element.

In one embodiment, the locking device has an interlocking mechanism that swivels about a stationary swivel pin extending transverse to a course of movement of the monitor and has a guide track that extends along the extent of the course of movement of the monitor and into which a sliding element, arranged on the monitor, projects in a displaceable manner. The interlocking mechanism is swivably shifted into a locked position engaging the leading guide element from the rear by a ramp-like course of the guide track.

The interlocking mechanism is preferably shifted into its unlocked position by spring action, so that the monitor is reliably enabled upon being moved into the recess.

In one embodiment, after locking the leading guide element in the active position end of its guide, the lagging guide element is moved in its guide by a further adjustment path until it reaches the active position end, it is thereby possible to set a desired inclined position of the monitor within a specific swivel range such that a readability of the monitor can be optimized.

It is impermissible for the interlocking mechanism to be further shifted in the event of a shifting of the monitor within the adjustment path. In a simple design, adjacent to its ramp-like course, the guide track has an adjustment path extending parallel to the guide of the lagging guide element when the interlocking mechanism is located in the locked position.

Linear drive of the monitor can be performed by, an electric motor rotary drive. The monitor can be movably driven in the guides by a coupling rod that extends in the direction of its course of movement and is hinged with one end to the monitor and is hinged with its other end to a swivel lever, capable of being swivably driven about a pin and extending transverse to the course of movement of the monitor, at a radial spacing from the pin.

In one embodiment, the guides are designed as guide grooves.

To provide a compact subassembly that can be pre-mounted, the guide grooves are arranged parallel to one another, formed in housing walls, of a monitor housing arranged in the dashboard. The monitor housing is preferably a plastic injection molded part, that is easy to produce.

Loading of the drive mechanism caused by friction of the guide elements in the guide grooves, which can cause damage to said drive mechanism, is avoided by virtue of the fact that the monitor housing comprises guide groove elements having the guide grooves and made from a slidable plastic, and a housing part made from a dimensionally stable plastic.

Preferably, the guide groove elements consist of a polyoxymethylene (POM), and the housing part comprises of a glass fiber filled plastic, the glass fiber filled plastic being a glass fiber filled polyamide (PA).

The monitor housing is preferably a dual component plastic injection molded part that is particularly simple and can be produced cost effectively and in a way that reduces outlay on mounting.

In one embodiment, the guide groove elements are inserted into corresponding recesses in the housing part.

BRIEF DESCRIPTION OF THE DRAWINGS

An exemplary embodiment of the invention is illustrated in the drawing and will be described in more detail below. In the drawing.

DETAILED DESCRIPTION OF THE PRESENTLY PREFERRED EMBODIMENTS

Figure 1:
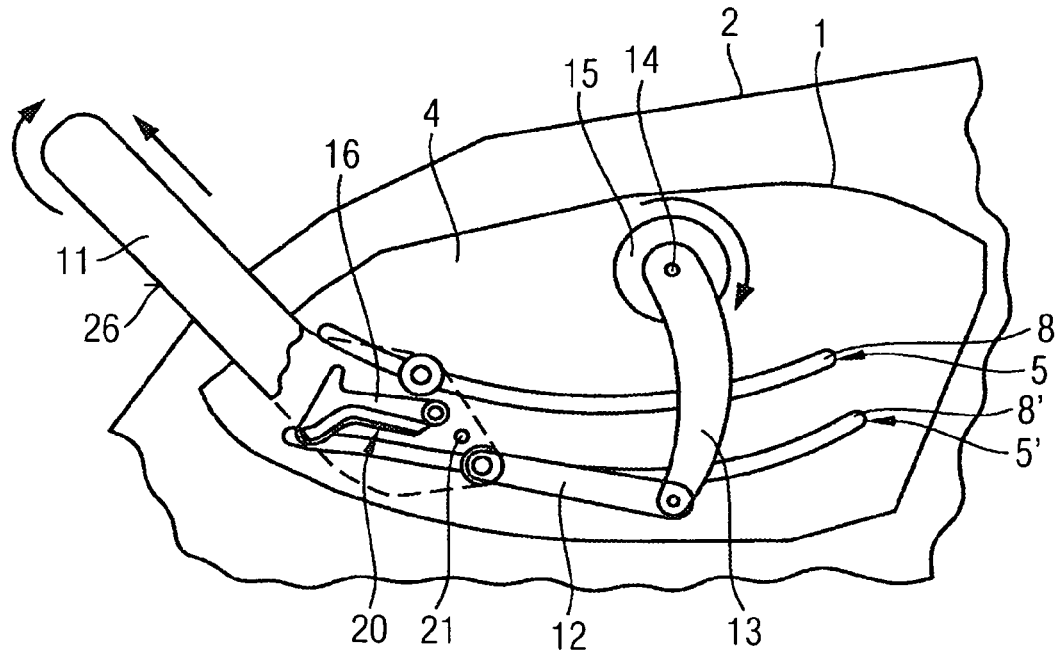
FIG. 1 is a side view of an on-board monitor device half way from an inactive position into an active position.
Figure 2:
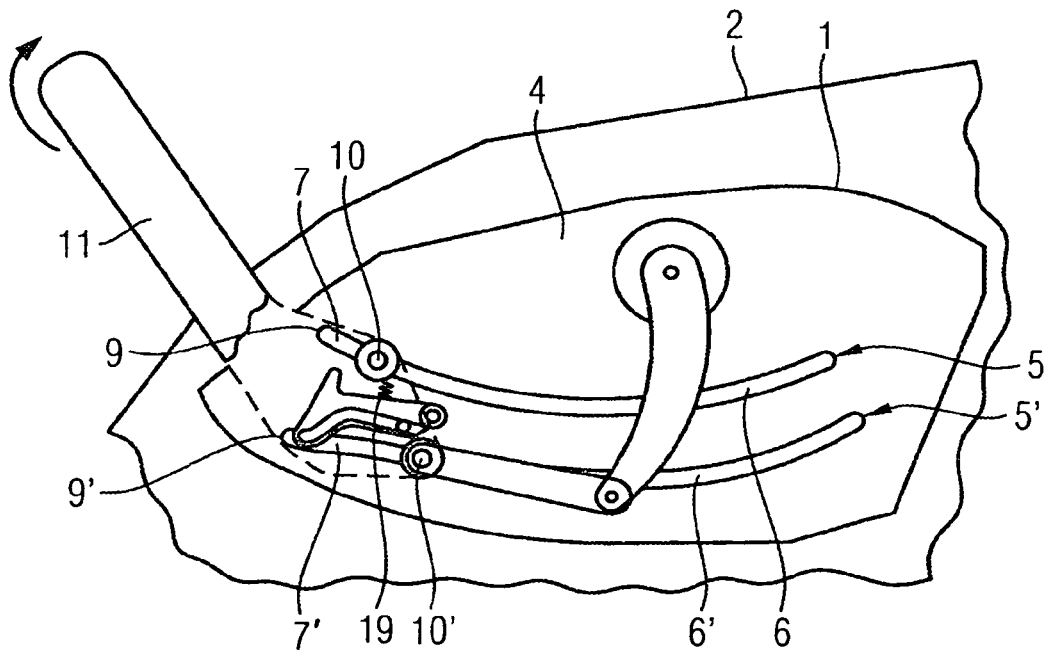
FIG. 2 is the on-board monitor device according to FIG. 1 on the way from the inactive position into the active position after engagement of a sliding element into a guide track of an interlocking mechanism.

The illustrated on-board monitor device has a monitor housing 1 that is arranged in a recess of a dashboard 2 of a motor vehicle, and has an opening 3 that is directed toward the periphery on the driver's side and corresponds to a corresponding opening (not illustrated) in the dashboard 2.

Respectively arranged in the mutually facing side walls 4 of the monitor housing 1 is a pair of guide grooves 5, 5' that extend approximately horizontally spaced apart from one another.

The guide grooves 5, 5' of a pair run approximately parallel to one another in the region 6, 6' remote from the opening 3, while the guide grooves 5, 5' have an increasing spacing from one another toward their end region 7, 7' proximate to the opening 3.

The ends, remote from the opening 3, of the guide grooves 5, 5' form inactive position ends 8, 8', and the ends, facing the opening, of the guide grooves 5, 5' form active position ends 9, 9'.

Displacably arranged in each guide groove 5, 5' is a guide element 10, 10' the guide elements 10, 10' are fastened spaced apart from one another on a lower end region of a monitor 11.

This spacing of the guide elements 10, 10' from one another corresponds approximately to the spacing of the guide grooves 5, 5' at their active position ends 9, 9'. which is preferably greater than the spacing of the guide grooves 5, 5' in their approximately parallel regions 6, 6'.

One end of a coupling rod 12 extends into the monitor housing 1 approximately in the same direction as the guide grooves 5, 5' and is hinged to the lower end region of the monitor 11, while a swivel lever 13 extending approximately perpendicular to the coupling rod 12 is in turn hinged to the other end.

The swivel lever 13 is supported swivably about a pin 14 so that swivel lever 13 and coupling rod 12 transverse to the extent of the guide grooves 5, 5' at a spacing from the hinge point at the coupling rod 12, and can be swivably driven about the pin 14 by an electric motor 15.

By swiveling the swivel lever 13, the monitor 11 is moved between an approximately horizontal inactive position inside the monitor housing 1 and an approximately vertical active position projecting from the opening 3 of the monitor housing 1 and the dashboard 2, the swiveling of the monitor 11 from the horizontal into the vertical position being effected by the divergence of the guide grooves 5, 5' in their end regions 7, 7'.

Respectively arranged on the side walls 4 between the guide grooves 5, 5' is an interlocking mechanism 16 that can swivel about a swivel pin 17 that is parallel to the pin 14. Interlocking mechanism 16 extends approximately toward the opening 3 and has at its free end an interlocking mechanism lug 18 substantially transverse to the extent of the interlocking mechanism 16 toward the upper guide groove 5.

A spring 19 shifts the interlocking mechanism 16 into its end position closer to the lower guide groove 5'. Furthermore, there is formed in the interlocking mechanism 16 a groove-like guide track 20 into which a sliding element 21 arranged permanently on the 1 monitor projects and can be displaced along the guide track 20.

With its end closer to the swivel pin 17, the guide track 20 opens outward and firstly has in the direction of the opening 3 a course or track 22 that is approximately parallel to the guide groove 5' and then merges into a ramp-like course 23 approaching the lower guide groove 5' in order then, in turn, to merge into an adjusting course 24 approximately parallel to the lower guide groove 5'.

The monitor 11 is moved from its horizontal inactive position, in which it is moved into the monitor housing 1, in the direction toward the active position, the result is the course illustrated in FIGS. 1 to 7.

Firstly, the monitor 11 is displaced in its approximately horizontal position with its guide elements 10, 10' in the guide grooves 5, 5' (FIG. 1) until the guide elements 10, 10' reach the beginning of the end region 7, 7'.

The sliding element 21 also passes into the guide track 20 in this process.

Figure 3:
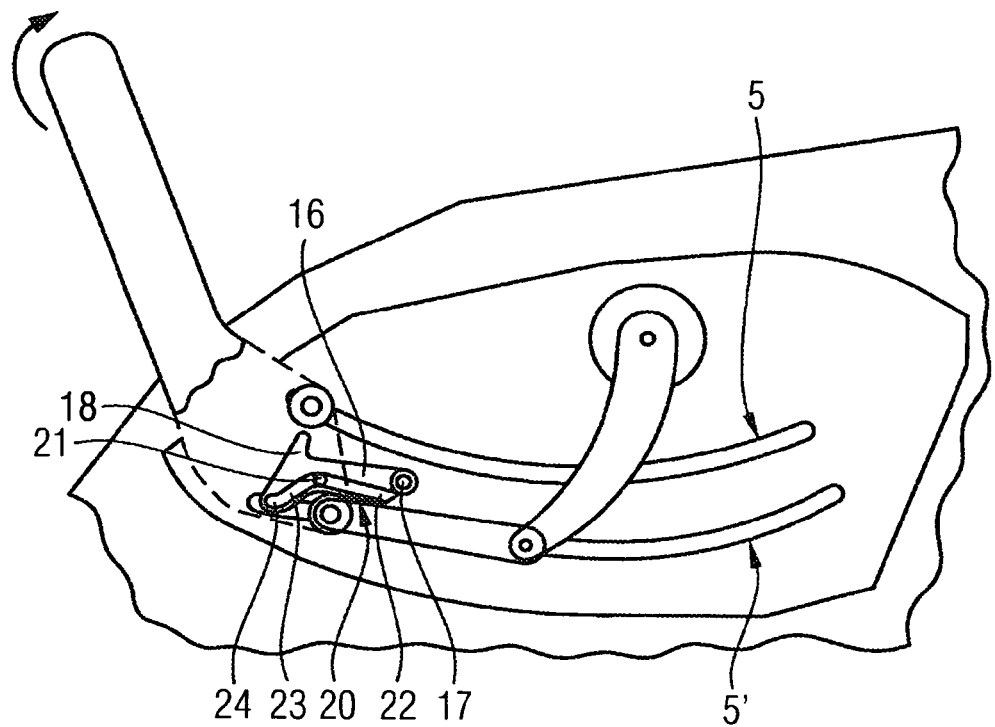
FIG. 3 is the on-board monitor device according to FIG. 1 on the way from the inactive position into the active position upon reaching a ramp-like course of the sliding element in the guide track of the interlocking mechanism.
Figure 4:
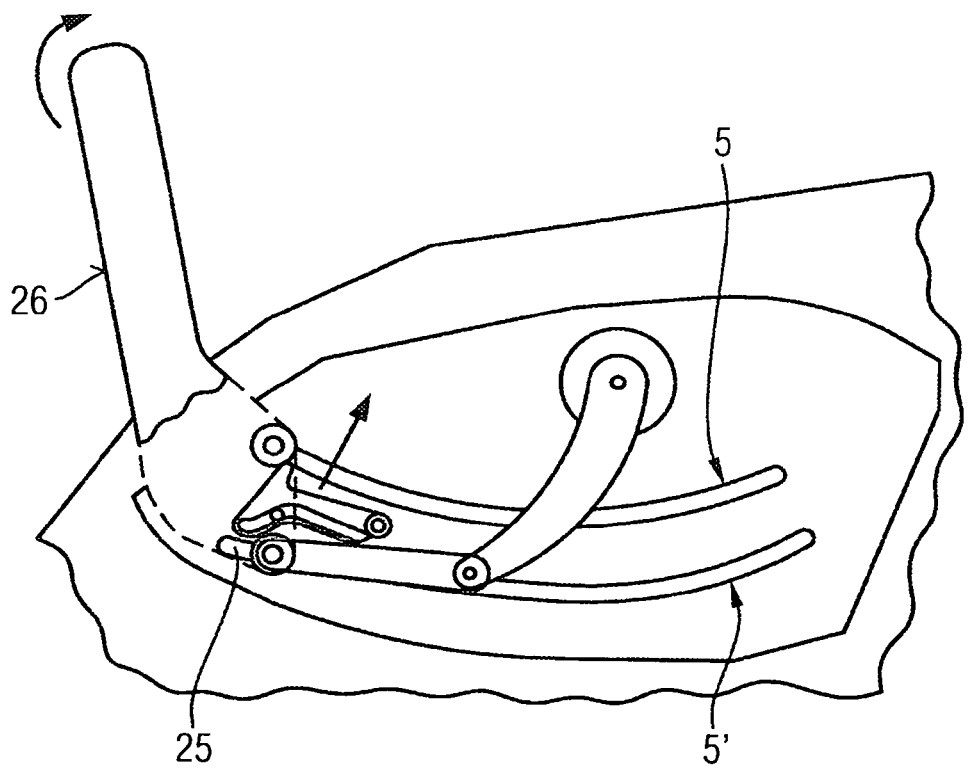
FIG. 4 is the on-board monitor device according to FIG. 1 on the way from the inactive position into the active position half way along the ramp-like course of the sliding element in the guide track of the interlocking mechanism.
Figure 5:
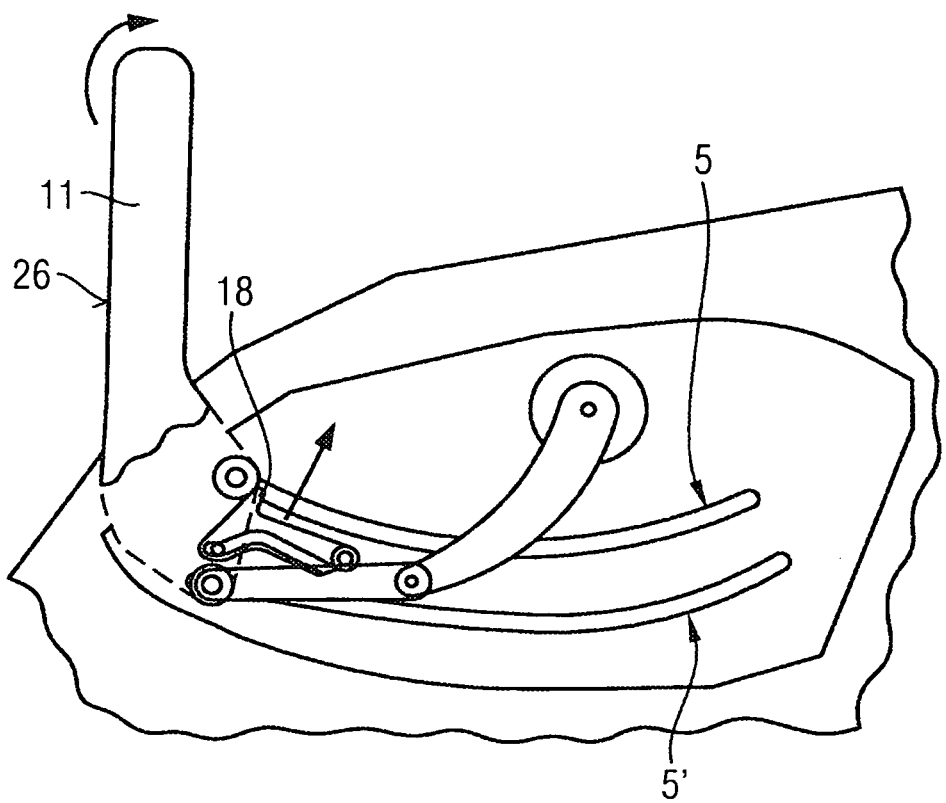
FIG. 5 is the on-board monitor device according to FIG. 1 with a guide element in an active position, and the interlocking mechanism in the locked position.
Figure 6:
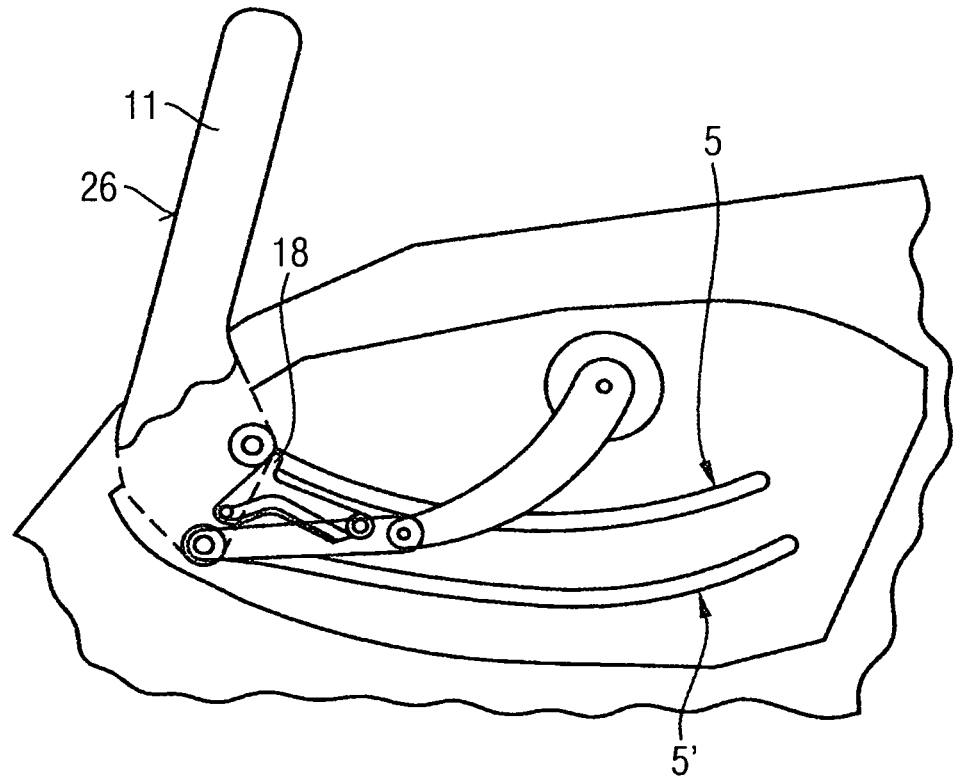
FIG. 6 shows the on-board monitor device according to FIG. 1 with two guide elements in an active position, and the interlocking mechanism in the locked position.
Figure 7:
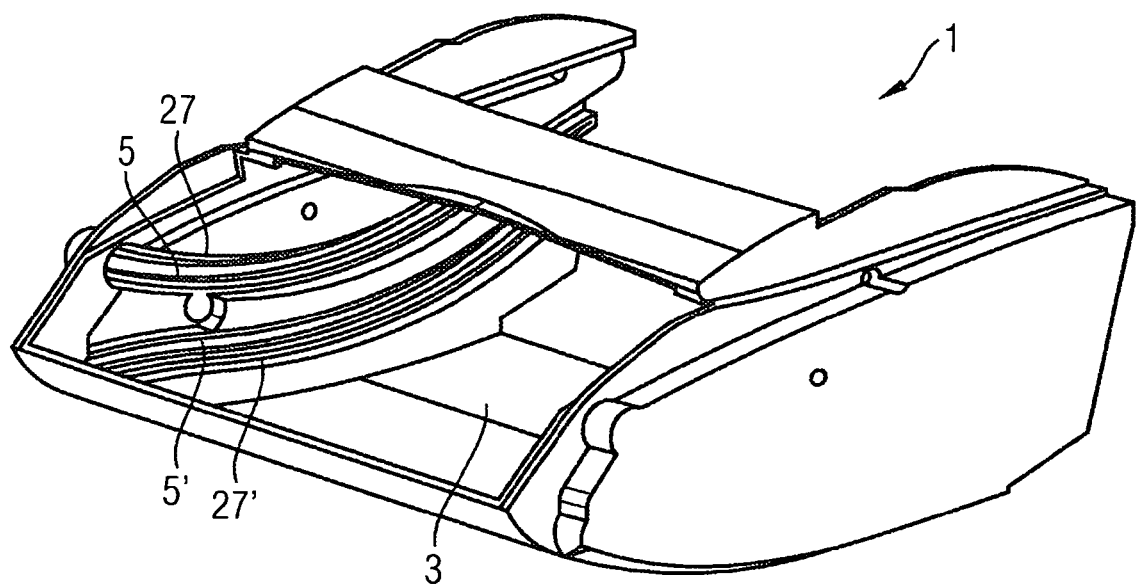
FIG. 7 is a perspective view of a monitor housing of the on-board monitor device according to FIG. 1.
Figure 8:
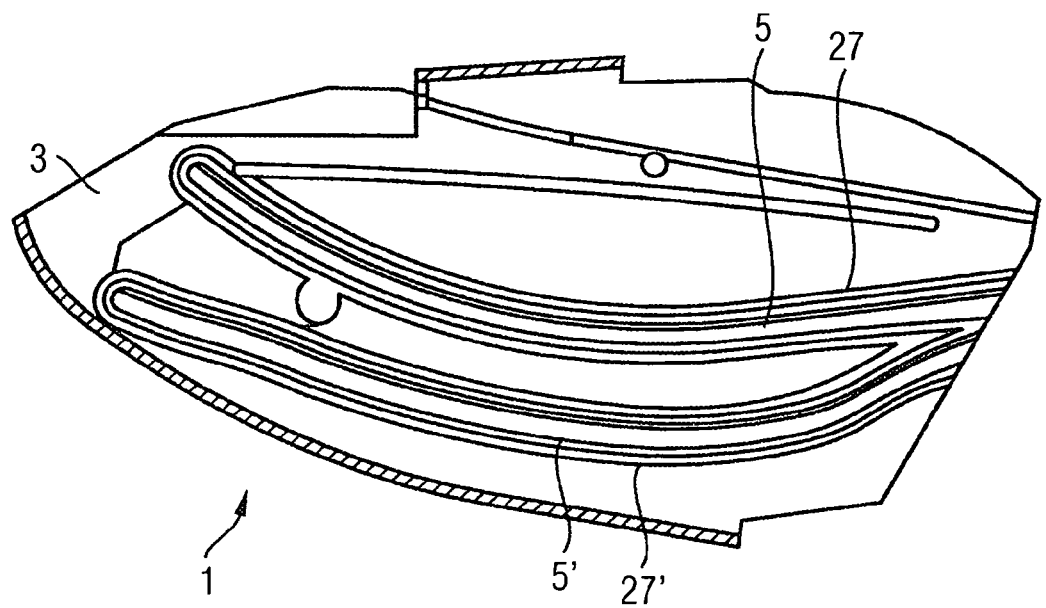
FIG. 8 is a view of a side wall of the monitor housing according to FIG. 7.
Figure 9:
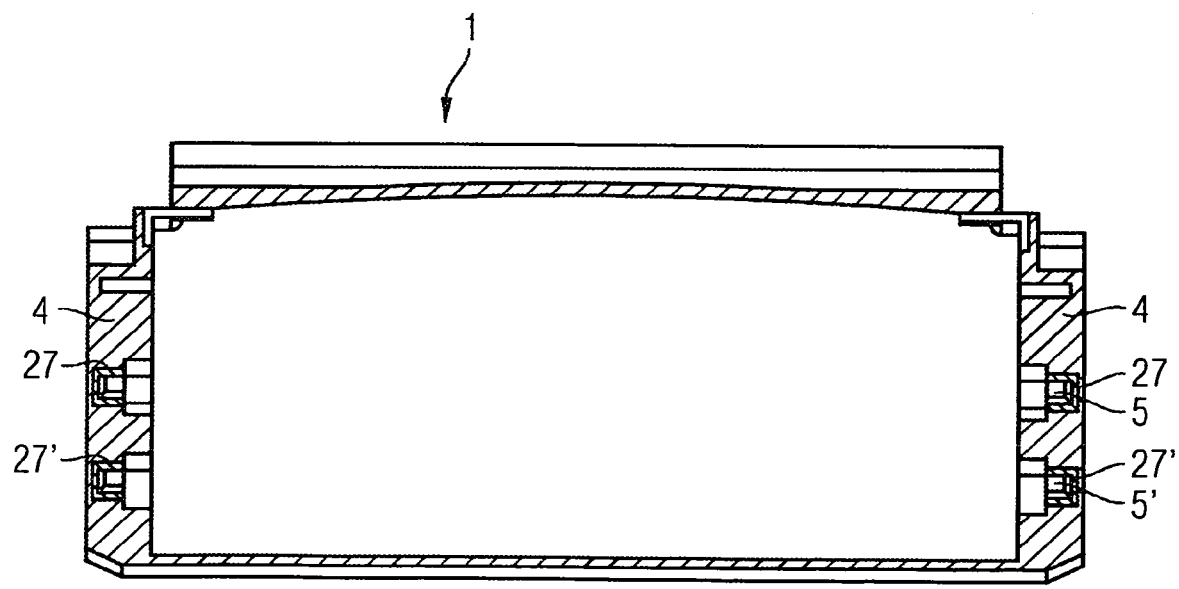
FIG. 9 shows a cross section of the monitor housing according to FIG. 7.
Figure 10:
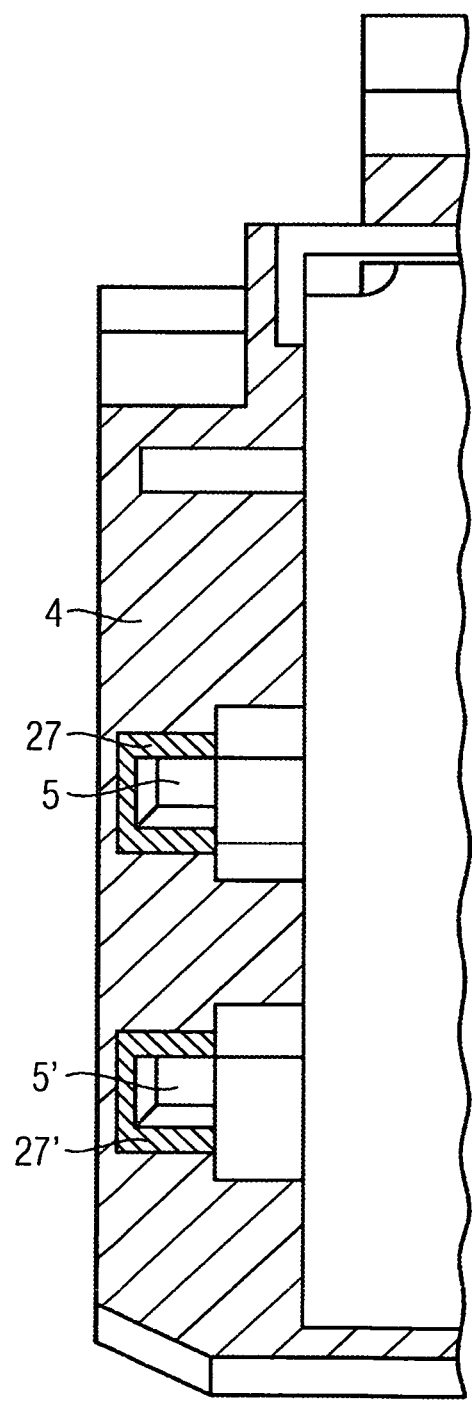
FIG. 10 shows an enlarged cross section of a side wall of the monitor housing according to FIG. 7.

Upon further movement of the monitor 11, the latter is gradually moved by the diverging guide grooves 5, 5' in the direction toward its approximately vertical position (FIG. 2) until the upper guide element 10 has reached the active position end 9 of the guide groove 5 (FIG. 3). At the same time, the sliding element 22 has reached the beginning of the ramplike course 23 of the guide track 20.

The lower guide element 10' is still removed by an adjustment path 25 from the active position end 9' of the lower guide groove 5'. In the event of a further outward movement of the monitor 11, the interlocking mechanism 16 is swiveled in the direction toward the upper guide groove 5 as the sliding element 21 slides along in the ramplike course 23 of the guide track 20 (FIG. 4), until said interlocking mechanism engages the guide element 10 with its interlocking mechanism lug 18 (FIG. 5) and thereby locks it.

The outward movement of the monitor 11 leads to a further swiveling into a vertical position of the monitor 11.

The further course of movement (FIG. 6), in which the lower guide element 10' can still be moved in the adjustment path 25 of the lower guide groove 5' until it reaches the active position end 9' serves the purpose of setting the respectively optimal position of the plane 26 of the drawing of the monitor 11 toward an observer. The locking mechanism 26 is held in its locked position by the adjusting course 24 of the guide track 20.

The monitor 11 is moved into the monitor housing 1 in a reverse sequence.

As illustrated in more detail in FIGS. 7 to 10, the guide grooves 5, 5' in guide groove elements 27, 27' are made from a slidable plastic such as, for example, polyoxymethylene (POM), and are arranged in the side walls 4 of the monitor housing 1 preferably consisting of a glass fiber filled polyamide (PA).

Here, the monitor housing 1 with the guide groove elements 27, 27' is a dual component plastic injection molded part.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An on-board monitor device in a dashboard of a motor vehicle, comprising:
    a drive mechanism;
    a monitor driven by the drive mechanism between an approximately horizontal inactive position inside a recess of the dashboard through an opening of the recess into an approximately perpendicular active position outside the recess;
    a first pair of guides spaced apart from one another that extend approximately horizontally, the guides being substantially parallel in a region closer to the inactive position to a location and, at the location, the guides continue to extend and have an increasing spacing where the guides diverge from each other in a region toward an end of the guides closer to the active position;
    a first pair of guide elements arranged on a first side of the monitor that traverse the first guides, each of the guide elements in a respective guide; and
    a locking device configured to lock at least one of the first guide elements in the respective guide.

2. The on-board monitor device as claimed in claim 1, further comprising a second pair of guide elements arranged on a second side of the monitor that traverse a second pair of guides.

3. The on-board monitor device according to claim 1, wherein the spacing of the guides in the region where the guides are substantially parallel to one another is smaller than the spacing of the guide elements from one another, and the spacing of the active position ends of the guides substantially corresponds to the spacing of the guide elements.

4. The on-board monitor device according to claim 3, wherein upon a movement of the monitor into its active position, the guide element, acting as a leading guide element, reaches the active position end of the guide and is locked in its active position by the locking device.

5. The on-board monitor device according to claim 4, wherein the locking device is a spring-latching device.

6. The on-board monitor device according to claim 3, further comprising a stationary swivel pin extending transverse to a course of movement of the monitor, wherein the locking device swivels about the stationary swivel pin and be swivelably shifted by the guide element acting as a lagging guide element from an unlocked position into a locked position engaging the leading guide element.

7. The on-board monitor device according to claim 3, wherein the locking device comprises an interlocking mechanism that swivels about a stationary swivel pin extending transverse to a course of movement of the monitor, the locking device having a guide track extending along the locking device along the course of movement of the monitor, and a stationary sliding element from the monitor mates with the guide track, wherein the interlocking mechanism is swivelably shifted into a locked position engaging the leading guide element by a ramp-like course of the guide track.

8. The on-board monitor device according to claim 7, wherein the interlocking mechanism is shifted into its unlocked position by spring action.

9. The on-board monitor device according to claim 6, wherein after locking of the leading guide element in the active position end of its respective guide, the lagging guide element is moved in its guide by an adjustment path until it reaches the active position end.

10. The on-board monitor device according to claim 9, wherein the adjustment path extends substantially parallel to the guide of the lagging guide element adjacent to its ramp-like course.

11. The on-board monitor device according to claim 1, further comprising:
    a coupling rod that drives the monitor in the guides, the coupling rod extending in a direction of its course of movement and is hinged with one end to the monitor and is hinged with its other end to a swivel lever that is swivelably driven about a pin and extending transverse to the course of movement of the monitor, the other end of the coupling rod at a radial spacing from the pin.

12. The on-board monitor device according to claim 1, wherein the guides are designed as guide grooves.

13. The on-board monitor device according to claim 12, wherein the guide grooves are arranged parallel to one another and are formed in housing walls of a monitor housing arranged in the dashboard.

14. The on-board monitor device as claimed in claim 13, wherein the monitor housing is a plastic injection molded part.

15. The on-board monitor device as claimed in claim 14, wherein the monitor housing comprises guide groove elements made from a slidable plastic, and a housing part made from a dimensionally stable plastic.

16. The on-board monitor device as claimed in claim 15, wherein the guide groove elements comprise polyoxymethylene (POM).

17. The on-board monitor device as claimed in claim 15, wherein the housing part consists of a glass fiber filled plastic.

18. The on-board monitor device as claimed in claim 17, wherein the glass fiber filled plastic is a glass fiber filled polyamide (PA).

19. The on-board monitor device according to claim 14, wherein the monitor housing is a dual component plastic injection molded part.

20. The on-board monitor device according to claim 15, wherein the guide groove elements are inserted into corresponding recesses in the housing part.

* * * * *